(No Model.)

M. M. ROBERTS.
HORSE DETACHER.

No. 262,619. Patented Aug. 15, 1882.

Attest.
Hosea H. Vie
William H. Lowe

Inventor.
Marion Monroe Roberts

United States Patent Office.

MARION M. ROBERTS, OF GOSSETT, ILLINOIS.

HORSE-DETACHER.

SPECIFICATION forming part of Letters Patent No. 262,619, dated August 15, 1882.

Application filed December 10, 1881. (No model.)

*To all whom it may concern:*

Be it known that I, MARION M. ROBERTS, of the town of Gossett, county of White, and State of Illinois, have invented certain new and useful Improvements in Horse-Detachers, of which the following is a specification.

My said invention consists in certain novel arrangements and combinations of parts whereby horses can be instantly detached when desired, as in case of their running away, as will be hereinafter more specifically set forth.

Figure 1:
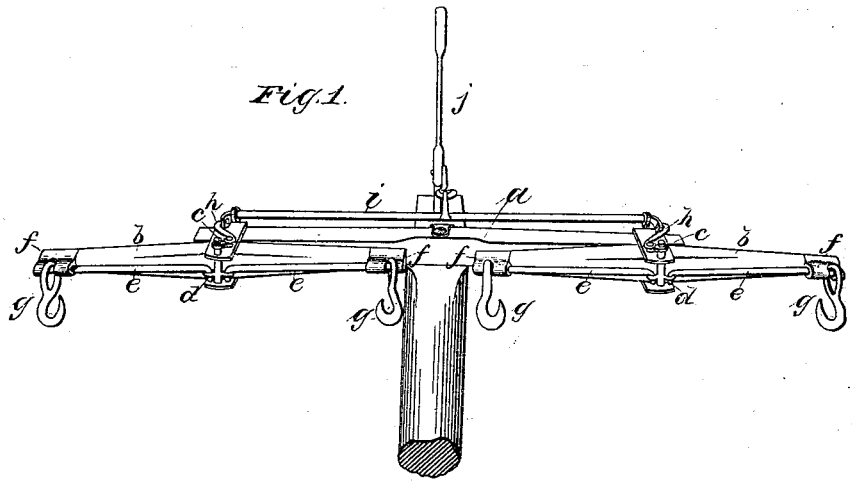
Figure 2:
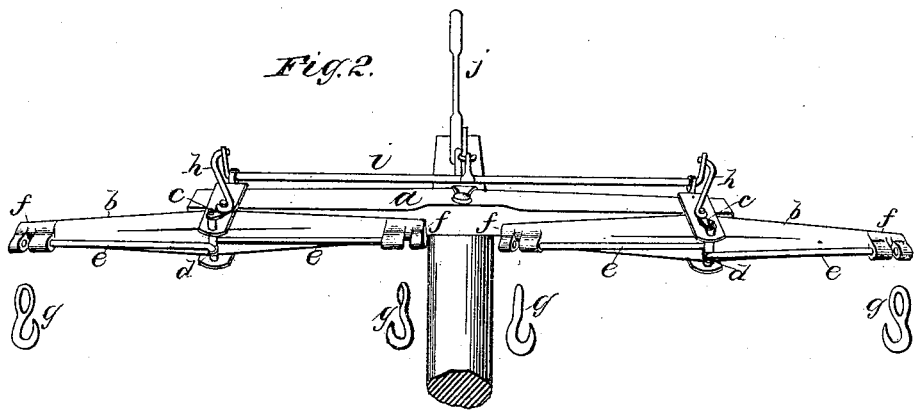

Referring to the accompanying drawings, which are made a part hereof, and on which similar letters of reference indicate similar parts, Figure 1 is a perspective view of a wagon-tongue bearing the usual double-tree and single-trees and provided with my invention, said invention being in the position as when the trace hooks or eyes are connected thereto; and Fig. 2 is a similar view when the said trace hooks or eyes are disconnected.

In said drawings the portions marked $a$ represent the double-tree of my improved device; $b\ b$, the single-trees; $c\ c$, the clips by which the double and single trees are connected; $d$, tumblers by which the latch-bolts are operated; $e$, said latch-bolts; $f$, ferrules on the ends of the single-trees; $g$, the hooks or trace ends which are attached thereto or detached therefrom; $h$, small rods connecting the tumblers to a rock-shaft; $i$, said rock-shaft, and $j$ a lever for operating the same.

The double-tree $a$, single-trees $b$, clips $c$, and hooks $g$ are or may be of any usual or approved form, and need no special description.

The tumblers $d$ are short vertical rods, pivoted between the upper and lower parts of the clips $c$, provided with wings to which the latch-bolts $d$ are attached, and crank-arms upon the upper ends by which they are rotated.

One end of each of the latch-bolts $e$ is connected to a wing of a tumbler, $d$, and the other passes through a ferrule, $f$, and the eye, hook, or trace end which is inserted therein.

The ferrules $f$ are like most other ferrules, except that they are each preferably provided with two branches extending forward, instead of one between which the hooks $g$ or other attachments are inserted. Holes running substantially parallel with the single-trees are also provided, into which the ends of the latch-bolts $e$ enter.

The links or rods $h$ are merely connecting-links between the crank-arms on the tumblers $d$ and those on the ends of the rock-shaft $i$. The rock-shaft $i$ serves, when partly rotated by means of the rods $h$, to partly rotate the tumblers $d$, and thus operate the latch-bolts simultaneously.

The lever $j$ is any ordinary lever for operating the rock-shaft, and is connected thereto in any suitable manner, the rod or link shown being a desirable method.

The operation of my said invention is as follows: The parts being all in the position shown in Fig. 1, and it being desired to detach the horses, the lever $j$ is pulled back, which, through the rock-shaft $i$, rods $h$, and tumblers $d$, operates to withdraw the latch-bolts $e$ so far as to clear the space between the two branches of the ferrules, thereby permitting the hooks $g$ or such like parts to drop out of engagement, the several parts being after this operation in the positions shown by Fig. 2. When it is desired to reattach the horses the hooks $g$ are again placed in position and the lever $j$ thrown back into its former position.

This mechanism constitutes a durable, efficient, and easily-operated device for its purpose, and is not expensive.

Having thus fully described my said invention, what I claim as new, and desire to secure by Letters Patent, is—

In a horse-detacher, the combination of the double-tree $a$, single-tree $b$, clips $c$, tumblers $d$, latch-bolts $e$, ferrules $f$, hooks $g$, rods $h$, rock-shaft $i$, lever $j$, and rod connecting said rock-shaft and said lever, all constructed, arranged, and operating substantially as shown and described, and for the purposes specified.

MARION MONROE ROBERTS.

Witnesses:
HOSEA H. VISE,
WILLIAM H. LOWE.